(12) United States Patent
Kuwahara et al.

(10) Patent No.: US 9,370,884 B2
(45) Date of Patent: Jun. 21, 2016

(54) RESIN MOLDING APPARATUS AND RESIN MOLDING METHOD

(75) Inventors: Hideyuki Kuwahara, Kyoto (JP); Tsutao Katayama, Kyoto (JP); Kazuto Tanaka, Kyoto (JP)

(73) Assignees: THE DOSHISHA, Kyoto (JP); HIDEYUKI KUWAHARA, Kyoto (JP)

( * ) Notice: Subject to any disclaimer, the term of this patent is extended or adjusted under 35 U.S.C. 154(b) by 297 days.

(21) Appl. No.: 13/255,586

(22) PCT Filed: Mar. 10, 2010

(86) PCT No.: PCT/JP2010/054046
§ 371 (c)(1),
(2), (4) Date: Sep. 9, 2011

(87) PCT Pub. No.: WO2010/104129
PCT Pub. Date: Sep. 16, 2010

(65) Prior Publication Data
US 2012/0168990 A1    Jul. 5, 2012

(30) Foreign Application Priority Data

Mar. 12, 2009 (JP) ................................. 2009-060143

(51) Int. Cl.
*B29C 43/52* (2006.01)
*B29C 33/08* (2006.01)
*B29C 33/06* (2006.01)
*H05B 3/00* (2006.01)
(Continued)

(52) U.S. Cl.
CPC ................. *B29C 43/52* (2013.01); *B29C 33/08* (2013.01); *B29C 33/00* (2013.01); *B29C 33/0083* (2013.01); *B29C 33/06* (2013.01); *B29C 35/12* (2013.01); *B29C 43/36* (2013.01); *B29K 2105/0854* (2013.01); *H05B 3/00* (2013.01)

(58) Field of Classification Search
CPC ........ B29C 33/08; B29C 43/52; B29C 35/12; B29C 33/0083; B29C 33/06; B29C 43/36; H05B 3/00
USPC ........... 425/174.6; 264/402, 405; 249/78, 111
See application file for complete search history.

(56) References Cited

U.S. PATENT DOCUMENTS 2,979,773 A * 4/1961 Bolstad ........................... 249/78
4,423,191 A * 12/1983 Haven et al. ................... 525/169
(Continued)

FOREIGN PATENT DOCUMENTS

GB        1278642     *  5/1970  .............. B29C 33/02
JP      46-14155 B1       4/1971
(Continued)

OTHER PUBLICATIONS

Official Communication issued in International Patent Application No. PCT/JP2010/054046, mailed on Apr. 27, 2010.

*Primary Examiner* — Seyed Masoud Malekzadeh
(74) *Attorney, Agent, or Firm* — Keating and Bennett, LLP (57) ABSTRACT

A resin molding apparatus includes a pair of metal molds respectively arranged so as to be insulated from the ground with insulating materials, and a molding portion including the pair of metal molds and to which a resin material is provided. At least one metal mold of the pair of metal molds is provided with electrodes at two points flanking the molding portion. A high frequency current generator capable of applying high frequency current having a frequency of about 10 kHz or more is connected to the two electrodes.

2 Claims, 6 Drawing Sheets

(51) Int. Cl.
  *B29C 33/00*   (2006.01)
  *B29C 35/12*   (2006.01)
  *B29C 43/36*   (2006.01)
  *B29K 105/08*  (2006.01)

(56) References Cited

U.S. PATENT DOCUMENTS

| | | | | |
|---|---|---|---|---|
| 4,496,131 | A * | 1/1985 | Yang | 249/78 |
| 5,041,247 | A * | 8/1991 | Kim | 264/37.1 |
| 5,176,839 | A * | 1/1993 | Kim | 249/78 |
| 5,227,180 | A * | 7/1993 | Tisack et al. | 425/174 |
| 5,965,080 | A * | 10/1999 | Ando et al. | 264/404 |
| 6,136,255 | A * | 10/2000 | Ando et al. | 264/415 |
| 6,612,826 | B1 * | 9/2003 | Bauer et al. | 425/135 |
| 7,679,036 | B2 * | 3/2010 | Feigenblum et al. | 219/635 |
| 7,682,552 | B2 * | 3/2010 | Nien et al. | 264/408 |
| 7,887,739 | B2 * | 2/2011 | Chou et al. | 264/402 |
| 8,021,135 | B2 * | 9/2011 | Anbarasu et al. | 425/3 |
| 8,372,327 | B2 * | 2/2013 | Matsen et al. | 264/258 |
| 8,375,758 | B1 * | 2/2013 | Matsen et al. | 72/60 |
| 8,852,494 | B2 * | 10/2014 | Chou et al. | 264/484 |
| 2004/0058027 | A1 * | 3/2004 | Guichard et al. | 425/174.6 |
| 2004/0070116 | A1 * | 4/2004 | Kaiser et al. | 264/404 |
| 2005/0000404 | A1 * | 1/2005 | Kishi et al. | 117/13 |
| 2005/0212178 | A1 * | 9/2005 | Nien et al. | 264/408 |
| 2006/0279014 | A1 * | 12/2006 | Balchin et al. | 264/51 |
| 2007/0267405 | A1 * | 11/2007 | Feigen-Blum et al. | 219/601 |
| 2008/0106033 | A1 * | 5/2008 | Zhu | 271/307 |
| 2010/0086727 | A1 | 4/2010 | Katayama et al. | |
| 2013/0099089 | A1 * | 4/2013 | Chang et al. | 249/78 |
| 2013/0334741 | A1 * | 12/2013 | Takai | 264/403 |

FOREIGN PATENT DOCUMENTS

| | | |
|---|---|---|
| JP | 2003-311799 A | 11/2003 |
| JP | 2006-256078 A | 9/2006 |
| JP | 3947560 B2 | 7/2007 |

* cited by examiner

RESIN MOLDING APPARATUS AND RESIN MOLDING METHOD

The present invention claims priority to Japanese Patent Application No. 2009-060143 filed on Mar. 12, 2009, the entire content of which is hereby incorporated herein by reference.

BACKGROUND OF THE INVENTION

1. Field of the Invention

The present invention relates to a resin molding apparatus and a resin molding method, and more specifically to a resin molding apparatus and a resin molding method in which a thermoplastic resin material is press-molded.

2. Description of the Related Art

It is known that thermoplastic resin materials are molded by, for example, injection molding. Injection molding is one of a plurality of suitable methods for large scale production due to its extremely short molding cycles compared to other molding methods. According to injection molding, thermoplastic resins are heat-melted in injection molding machines, kneaded mechanically with, e.g., screws, and injected to metal molds. The metal molds are then cooled and molded articles are obtained. Another compression molding method, called stamp forming, may also be used. According to stamp forming, fiber-reinforced thermoplastic composite materials are heated to a melting point or higher of thermoplastic resins at the outside of metal molds to melt thereof, charged to metal molds at a temperature lower than the melting point of thermoplastic resins and subjected to compression molding in presses. The heating apparatuses used for stamp forming may be, for example, far-infrared heaters (IR heaters).

Japanese Patent Publication No. 3947560 suggests a method of press molding in which a composite sheet of a thermoplastic resin non-woven fabric combined with continuous reinforcement fibers is provided in a metal mold. As a heating apparatus of the metal mold, an electromagnetic induction-type heating apparatus is described.

Thermoplastic resin materials (e.g., fiber-reinforced thermoplastic composite materials) are considered to be useful in the future as materials for applications such as computer housings or automotive outer panels because they are lighter than metals such as iron or aluminum and they have certain strength. However, stabilization of the quality thereof and improvement in productivity are required in order to be in practical use for these applications.

When molding thermoplastic resin materials, it may be desirable to maintain the length of reinforcement fibers contained in the resins in order to improve mechanical properties (e.g., flexural strength, tensile strength) of molded articles. In order to stabilize the quality of molded articles, it is desirable to control the orientation of reinforcement fibers as much as possible. According to conventional injection molding, melted resin materials are kneaded mechanically with, e.g., screws and injected into metal molds in injection molding machines. In this case, reinforcement fibers contained in the resin materials are cut by screws upon mechanical kneading of melted resin materials, making it difficult to keep the length of reinforcement fibers in the resin materials long. It is also very difficult to control the orientation of the reinforcement fibers because they are injected into metal molds in injection molding machines.

Stamp forming, one of the other molding methods, requires steps of pre-heating and molding thermoplastic resin materials, so that there are limitations to shorten the molding cycle. It also has drawbacks in working efficiency such as handling of thermoplastic resin materials after a heating step.

According to Japanese Patent Publication No. 3947560, an electromagnetic induction-type heating apparatus is used as a heating apparatus of the metal molds. However, such an apparatus heats the molds by electromagnetic induction, so that the apparatus configuration is enlarged as well and is more complex. There is also a loss of energy upon generation of inductive current, increasing total energy required for molding. Thus, this method is susceptible to improvement in terms of energy saving and the like.

SUMMARY OF THE INVENTION

In view of the foregoing problems with conventional molding processes, preferred embodiments of the present invention provide a completely new resin molding apparatus.

The resin molding apparatus according to a preferred embodiment of the present invention is an apparatus to press-mold a thermoplastic resin material and preferably includes a pair of metal molds respectively arranged so as to be insulated from the ground with insulating materials. A molding portion to which the resin material is provided preferably includes the pair of metal molds. At least one metal mold of the pair of metal molds includes electrodes provided at two points flanking the molding portion. A high frequency current generator for applying high frequency current having a frequency of about 10 kHz or more, for example, between the two electrodes flanking the molding portion is electrically connected to the electrodes.

The resin molding apparatus preferably includes a pair of metal molds arranged via insulating materials, so that a short circuit does not occur when a resin material is provided to the molding portion and then high frequency current is applied to the metal molds from the high frequency current generator. The metal mold(s) is provided with a pair of electrodes at two points flanking the molding portion and high frequency current having a frequency of about 10 kHz or more, for example, is applied from the high frequency current generator connected to the electrodes. Due to this configuration, when high frequency current having a frequency of about 10 kHz or more, for example, is applied, the surface of the molding portion in the metal mold(s) is particularly heated, so that a resin material can be effectively heated. According to this resin molding apparatus, the metal mold(s) is particularly heated in the surface thereof, so that the time required for cooling the metal mold(s) can be reduced, making it possible to shorten the total molding cycle.

In the present preferred embodiment of a resin molding apparatus, a resin material including reinforcement fibers oriented to a certain direction is provided to the molding portion of the metal molds. The metal molds are closed thereafter and high frequency current having a frequency of about 10 kHz or more, for example, may be applied between two electrodes flanking the molding portion from the high frequency current generator electrically connected to the electrodes. Accordingly, the surface of the metal mold(s) is rapidly heated, so that the resin material can be melted and molded into a desired shape. The resin material is press-molded in this case, so that the length of the reinforcement fibers can be kept long and the direction thereof can be maintained in some extent, allowing maintenance of the length of the fibers.

In the resin molding method according to a preferred embodiment of the present invention, a thermoplastic resin material is provided to a molding portion of a pair of metal molds respectively arranged so as to be insulated from the ground with insulating materials. High frequency current is then applied to the pair of metal molds through electrodes provided in the pair of metal molds, thereby heating the pair of metal molds to mold the resin material provided to the molding portion. According to the present preferred embodiment of the resin molding method, resin materials can be effectively heated and the total molding cycle can be shortened. In addition, when the thermoplastic resin material includes reinforcement fibers, the reinforcement fibers can be maintained in their length and direction.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Preferred embodiments of the resin molding apparatus of the present invention will now be described by referring to the figures. In the figures illustrating each preferred embodiment, similar or same elements or portions are designated by the same number.

Figure 1:
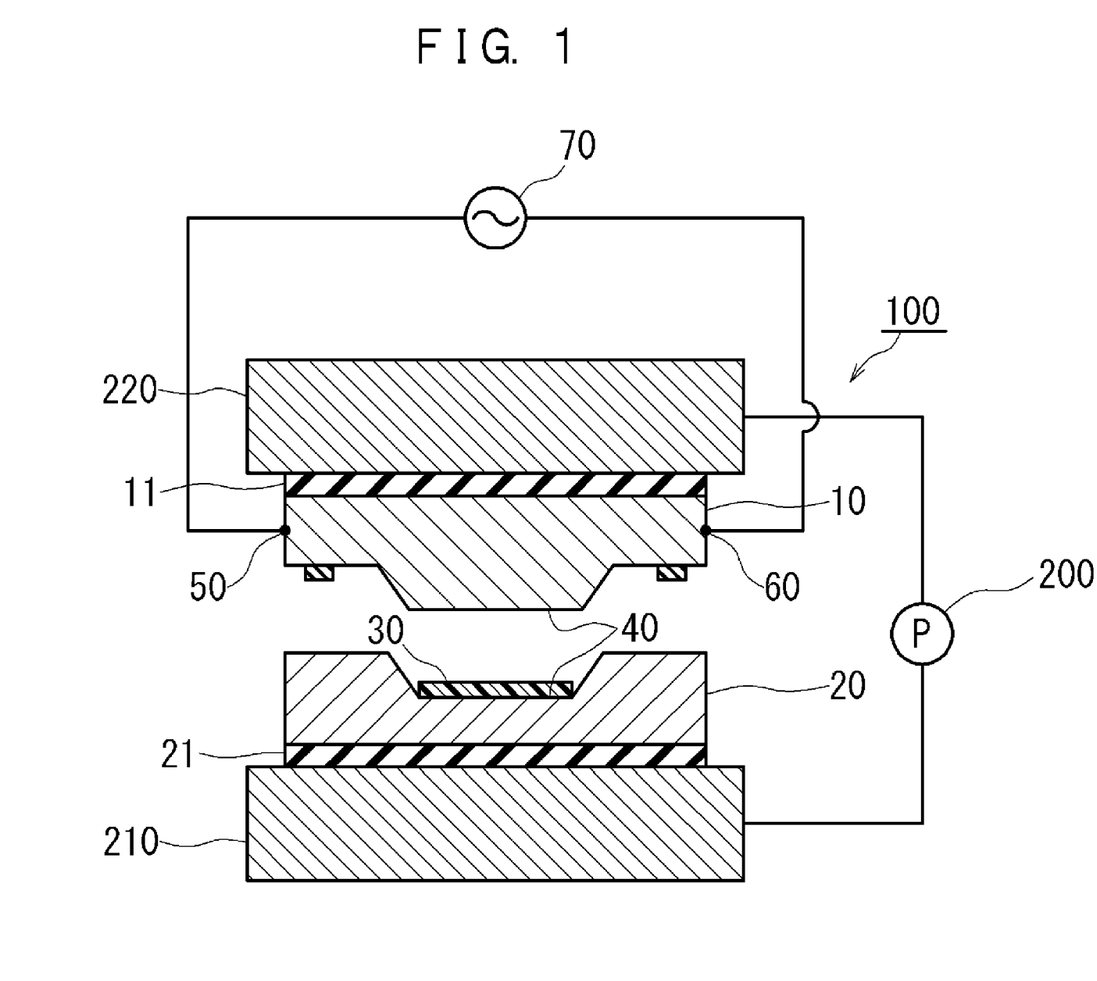
FIG. 1 is a section view of one preferred embodiment of the resin molding apparatus of the present invention.

FIG. 1 is a schematic view showing a structure of a resin molding apparatus 100. The resin molding apparatus 100 preferably includes metal molds 10 and 20 and a high frequency current generator 70, as shown in FIG. 1.

The metal molds 10 and 20 are respectively arranged so as to be insulated from the ground with insulating materials 11 and 21. According to this preferred embodiment, a pair of the metal molds 10 and 20 is provided in a press 200. The press 200 preferably includes a fixed member 210 and a movable member 220 which is opposed to the fixed member 210 in the vertical direction and is movable in the vertical direction. The press 200 can forcibly descend the movable member 220 with a certain force towards the fixed member 210.

The metal mold 10 which is an upper mold among the pair of metal molds 10 and 20 is arranged in the movable member 220 via the insulating material 11. The metal mold 20 which is a lower mold is arranged in the fixed member 210 via the insulating material 21. The upper and lower metal molds 10 and 20 are insulated from the movable member 220 and fixed member 210 respectively by the insulating materials 11 and 21. The insulating materials 11 and 21 may be provided with insulating resin materials such as nylon, Teflon® or ceramics such as alumina, magnesia. The pair of metal molds 10 and 20 is preferably made of metal materials, particularly of ferrous materials or cast iron, among which steel for molds, ultrahard materials, conductive ceramics such as TiN, Cr2N, CrN are preferable, in order to have a desired stiffness and conductivity. The materials for the insulating materials 11 and 21 and metal molds 10 and 20 are not limited to those described above and can be appropriately selected from the materials which can provide desired properties.

The pair of metal molds 10 and 20 preferably includes a molding portion 40 to which a resin material 30 is provided to be molded. At least one metal mold (for example, the upper metal mold 10 in this preferred embodiment) among the pair of metal molds 10 and 20 includes electrodes 50 and 60 at two points flanking the molding portion 40.

The high frequency current generator 70 is an apparatus generating high frequency current and is electrically connected to the electrodes 50 and 60 arranged in the metal mold 10. The high frequency current generator 70 can apply high frequency current between the pair of electrodes 50 and 60. The high frequency current generator 70 may be an apparatus which can adjust frequency and voltage of high frequency current. The high frequency current generator 70 can be, for example, MK3, MK12, MK15, MK16A, MK18, MK19, MK20, MK22, MK22A, MK24, MK30, MK40, MK50-51, all of which are available from NETUREN Co., Ltd. According to the present preferred embodiment, the high frequency current generator 70 is electrically connected between the electrodes 50 and 60 arranged in the metal mold 10. Accordingly, an appropriate tank circuit, which is not shown in the figures, may be combined with the high frequency current generator 70.

In the resin molding apparatus 100, the resin material 30 is provided to the molding portion 40 when the pair of metal molds 10 and 20 is opened as shown in FIG. 1. The resin material 30 may be, for example, a resin material including a thermoplastic resin and reinforcement fibers. Various resin materials may be used for the resin material 30, among which a resin material including reinforcement fibers oriented to a certain direction may preferably provided to the molding portion 40 of the metal molds. A suitable example of the resin material 30 is a prepreg which is a fabric of reinforcement fiber with which a thermoplastic resin has been impregnated. Prepregs are reinforcement fibers with which a thermoplastic resin has been impregnated, so that the direction of the reinforcement fibers is preliminarily maintained. In addition, a thermoplastic resin can be further impregnated with reinforcement fibers by re-heating upon molding in metal molds, so that the binding between the reinforcement fibers and the thermoplastic resin is enhanced.

Figure 3:
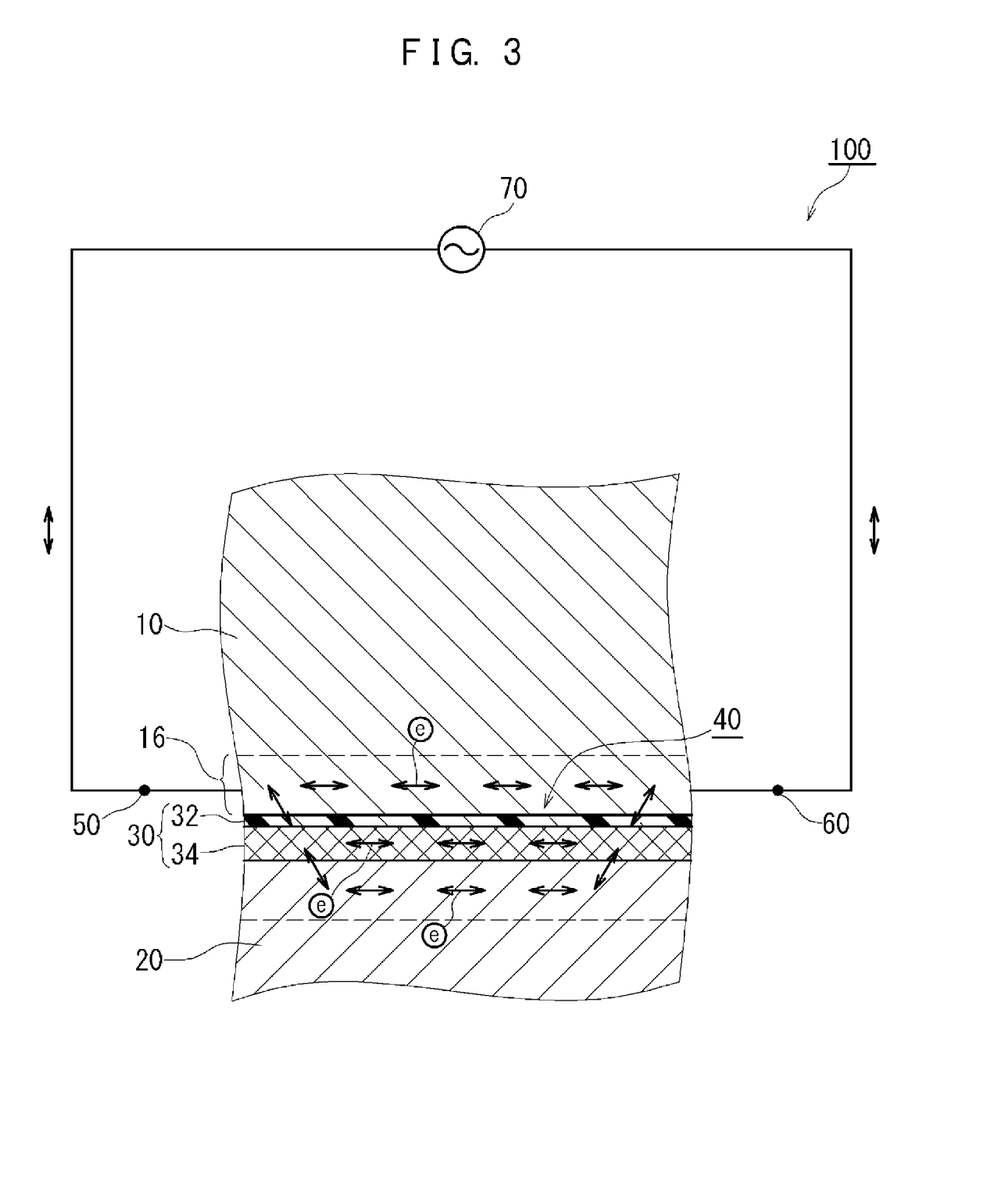
FIG. 3 is a view showing a current application state in one preferred embodiment of the resin molding apparatus of the present invention.

Another suitable example of the resin material 30 is, for example, a composite sheet described in Japanese Patent Publication No. 3947560 described above. In this composite sheet, continuous reinforcement fibers in each layer are oriented to a specific direction, such that the directions of the continuous reinforcement fibers differ from each other in the layers laminated together. In addition, a thermoplastic resin non-woven fabric is laminated with the continuous reinforcement fibers and is combined therewith through stitching. In the present preferred embodiment, this composite sheet is preferably used as the resin material 30, for example. In FIG. 3, the number 34 shows a laminated portion of the continuous reinforcement fibers and the number 32 shows the thermoplastic resin non-woven fabric which is combined with the continuous reinforcement fibers through stitching. Thus, this composite sheet 30 preferably includes the laminated portion 34 of the continuous reinforcement fibers and the thermoplastic resin non-woven fabric 32 laminated thereto. In this case, the thermoplastic resin non-woven fabric 32 may be arranged in the molding portion 40 so as to face the (upper) metal mold 10, as shown in FIG. 3.

Figure 2:
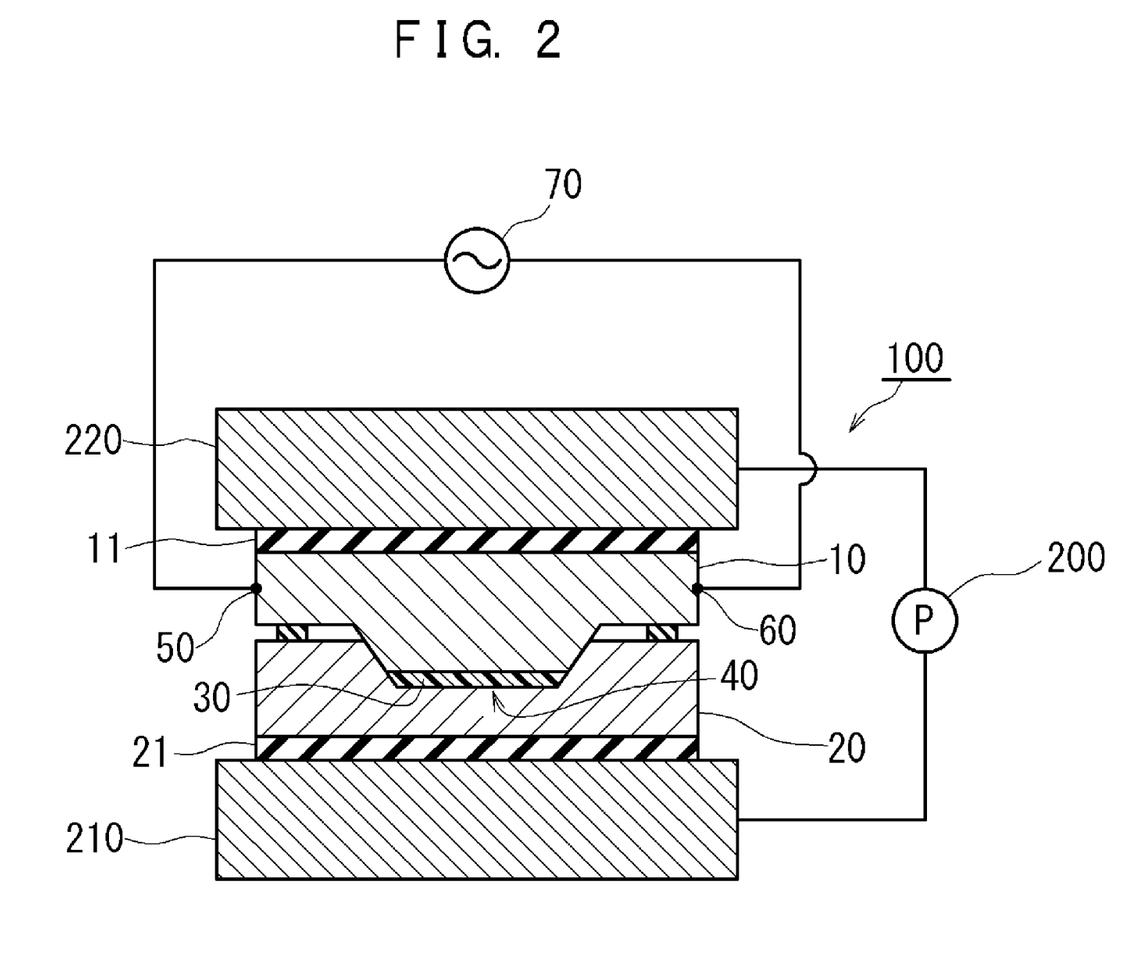
FIG. 2 is a section view of one preferred embodiment of the resin molding apparatus of the present invention in use.

In the present preferred embodiment, the resin material 30 is provided to the molding portion 40 and then the pair of metal molds 10 and 20 is closed as shown in FIG. 2. High frequency current is then applied between the pair of electrodes 50 and 60 in the metal mold 10 from the high frequency current generator 70. High frequency current having a frequency of about 10 kHz or more, for example, may be applied as high frequency current. High frequency current having a frequency of about 100 kHz or more, for example, is more preferred to be applied as high frequency current. High frequency current having a frequency of about 400 kHz or less, for example, is more preferred to be applied in order to obtain an appropriate output.

When high frequency current is applied between the pair of electrodes 50 and 60 in the metal mold 10, a surface portion 16 (a layer having a certain depth from the surface) of the metal mold 10 allows the majority of high frequency current to flow according to the nature of high frequency current, as shown in FIG. 3. The depth δ (cm) of the surface portion 16 can be calculated theoretically from the formula (1), wherein "δ (cm)" is the depth from the surface of the layer which allows 73% of the total current to flow; "ρ (μΩ-cm)" is an intrinsic resistance of a metal used for the metal mold 10; f (Hz) is a frequency; and "μ" is a relative permeability. An amount of heat Q generated at the surface portion 16 can be calculated theoretically from the formula (2), wherein R (Ω) is a resistance in the surface portion 16; i (A) is an amount of current allowed to flow in the surface portion 16; and t (s) is the duration of application of high frequency current.

$$\delta = 5.033 \times \sqrt{\frac{\rho}{\mu f}} \quad (1)$$

$$Q = 0.24 i^2 R t \quad (2)$$

As can be seen from the formula (1), when the frequency f of high frequency current applied between the pair of electrodes 50 and 60 in the metal mold 10 from the high frequency current generator 70 is increased, δ is decreased and the surface portion 16 in which the majority of high frequency current is allowed to flow becomes shallow. Accordingly, more heat tends to be generated at the surface layer in the metal mold 10.

In the present preferred embodiment, steel (SUS430 in this preferred embodiment) is used for the metal mold 10. The intrinsic resistance ρ (μΩ-cm) of the metal mold 10 is preferably about 60 (μΩ-cm) to 70 (μΩ-cm), for example. The relative permeability of the metal mold 10 is preferably about 20, for example. High frequency current having a frequency of about 10 kHz or more, for example, is preferably applied. Thus, the depth δ of the surface portion 16 in which about 63% of high frequency current is allowed to flow is about 0.09 cm or less, for example. When the frequency of high frequency current is increased in this case, the surface portion 16 in which the majority of high frequency current is allowed to flow becomes shallow, so that more heat tends to be generated at the surface portion of the metal mold 10. Due to such action of high frequency current, heat is generated at the surface portion 16 of the molding portion 40 of the metal mold 10, as shown in FIG. 3. In this case, heat is generated rapidly at the surface portion 16 of the metal mold 10. The duration of application of high frequency current may be adjusted so that the thermoplastic resin in the resin material 30 is sufficiently melted so as to be molded.

Materials for metal molds generally used for thermoplastic resin materials include, for example, SKS, SKD, SKT or SKH used as tool steel, or SUS or SUH used as steel for special purposes. These materials have an intrinsic resistance ρ (μΩ-cm) from about 8 (μΩ-cm) to 120 (μΩ-cm) and a relative permeability from about 300 to 1, for example. The high frequency current generator 70 can apply high frequency current having a frequency of about 10 kHz or more, for example, to metal molds. In this case, the frequency of high frequency current is extremely high compared to the intrinsic resistance ρ (μΩ-cm) or relative permeability of materials for metal molds, so that the depth δ of the surface portion 16 in which the majority of high frequency current is allowed to flow is mainly determined according to the frequency of high frequency current applied to metal molds, as can be seen from the above formula (1). When high frequency current having a frequency of about 10 kHz or more, for example, is applied to metal molds made of usual materials for metal molds, the depth δ of the surface portion 16 in which the majority of high frequency current is allowed to flow can be about 0.009 cm or less, for example.

According to the resin molding apparatus 100, heat is generated mainly at the surface portion 16 of the molding portion 40 of the metal mold 10, thereby the resin material 30 can be rapidly heated. Heat is generated at the surface portion 16 of the metal mold 10 and the inside of the metal mold 10 is merely heated due to heat transfer therefrom; thus the metal mold 10 as a whole is not heated to an extent that can melt resins. Thus, the metal mold 10 and the resin material 30 can be rapidly cooled down in a cooling step. A cooling configuration for the metal mold 10 is not shown in the figures; the metal mold can be cooled down by providing a flow passage in the metal mold 10 and allowing cooling water to flow through the flow passage, for example.

According to the present preferred embodiment, the surface portion 16 of the metal mold 10 allows the majority of high frequency current to flow. The depth δ of the surface portion 16 is preferably about 0.009 cm or less, for example, and heat is generated mainly at the surface portion 16 of the metal mold 10. The temperature of the surface portion 16 of the metal mold 10 may be a temperature required for molding a resin material. In this case, application of current to the metal mold 10 may be controlled in order to avoid the temperature of the metal mold 10 except for the surface portion 16 being too high. Accordingly, the temperature of the metal mold 10 except for the surface portion 16 can be prevented from getting very hot. In this case, there is less necessity to consider temperature dependency of the stiffness of the metal mold 10, thereby deformation and damage to the metal mold 10 can be prevented even when a high pressure is applied to the metal mold 10 upon molding. Accordingly, the resin molding apparatus 100 allows molding with high pressure at the metal mold 10, improving molding performances thereof.

According to the present preferred embodiment, the lower metal mold 20 does not have an electrode so that current is not applied directly thereto. Thus, a short circuit is not caused when current is applied to the lower metal mold 20 through reinforcement fibers. More specifically, the metal molds 10 and 20 are electrically insulated and current applied to the lower metal mold 20 through reinforcement fibers can flow back (return) to the upper metal mold 10 through reinforcement fibers in a similar manner, so that no potential difference is generated that causes a short circuit between the metal molds 10 and 20. Thus, the resin molding apparatus 100 can appropriately heat the resin material 30 placed in the molding portion 40 without causing a short circuit when the metal molds 10 and 20 are closed.

According to the resin molding apparatus 100, high frequency current is applied to the electrodes 50 and 60 flanking the molding portion 40 in the upper metal mold 10. In this case, reinforcement fibers in the resin material 30 may be fibers having no conductivity such as glass fibers, or fibers having high conductivity such as carbon fibers. When the reinforcement fibers are the fibers having high conductivity, high frequency current may also be applied to the resin material 30 through the fibers. The upper and lower metal molds 10 and 20 preferably are completely insulated from the ground with the insulating materials 11 and 21. Therefore, a short circuit does not occur even when high frequency current is applied to the resin material 30 through the reinforcement fibers because electricity returns to the metal mold 10 through the reinforcement fibers. In addition, when high frequency current is applied to the reinforcement fibers, heat can also be generated at the reinforcement fibers themselves. Moreover, the thermoplastic resin is heated in the vicinity of the reinforcement fibers, so that the viscosity of the resin is decreased and flowability of the resin is improved. Accordingly, the thermoplastic resin can be more easily impregnated with the periphery of the reinforcement fibers. In addition, binding between the reinforcement fibers and the thermoplastic resin is improved, thereby improving mechanical properties of molded articles.

Figure 4:
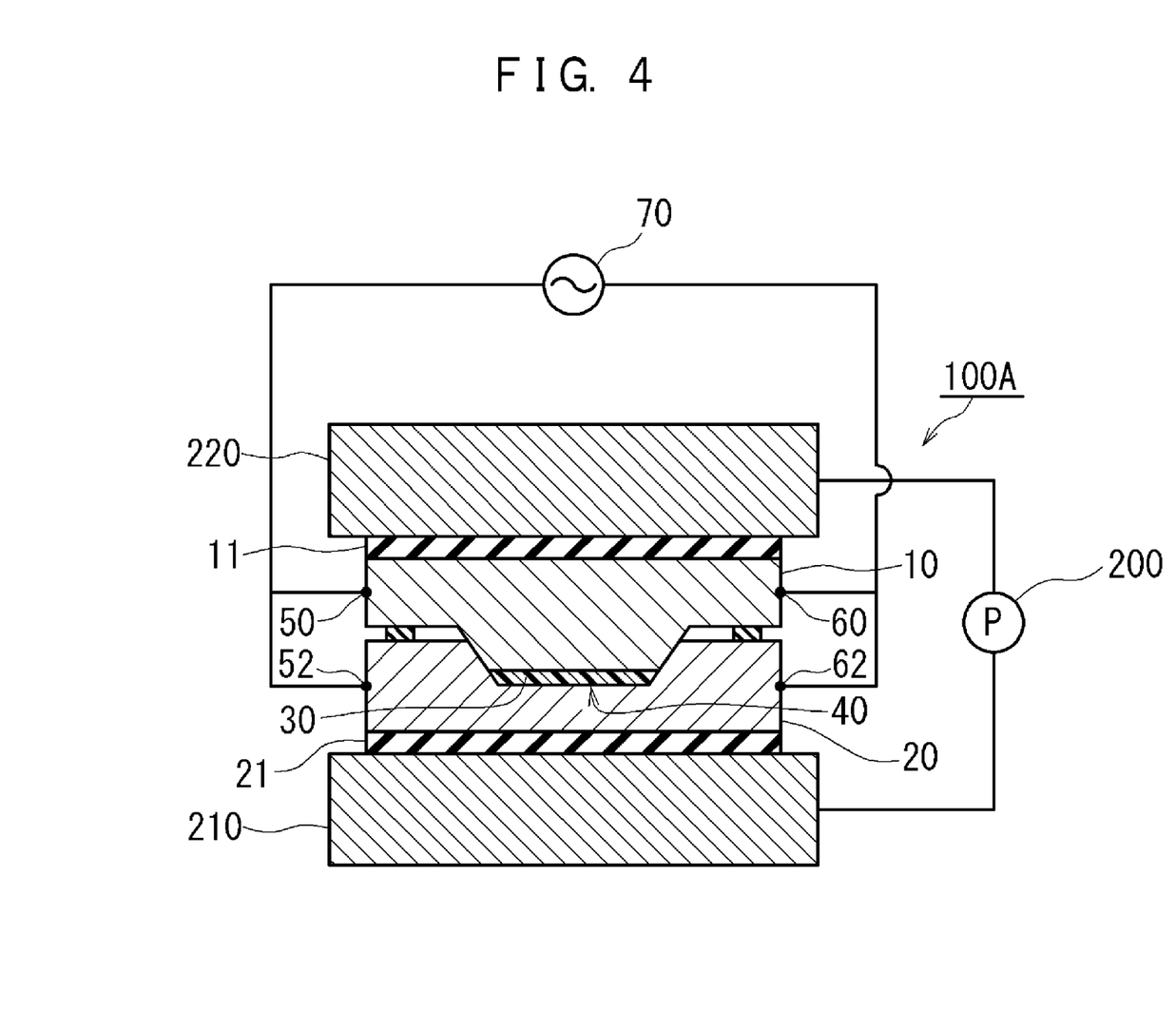
FIG. 4 is a section view of another preferred embodiment of the resin molding apparatus of the present invention in use.
Figure 5:
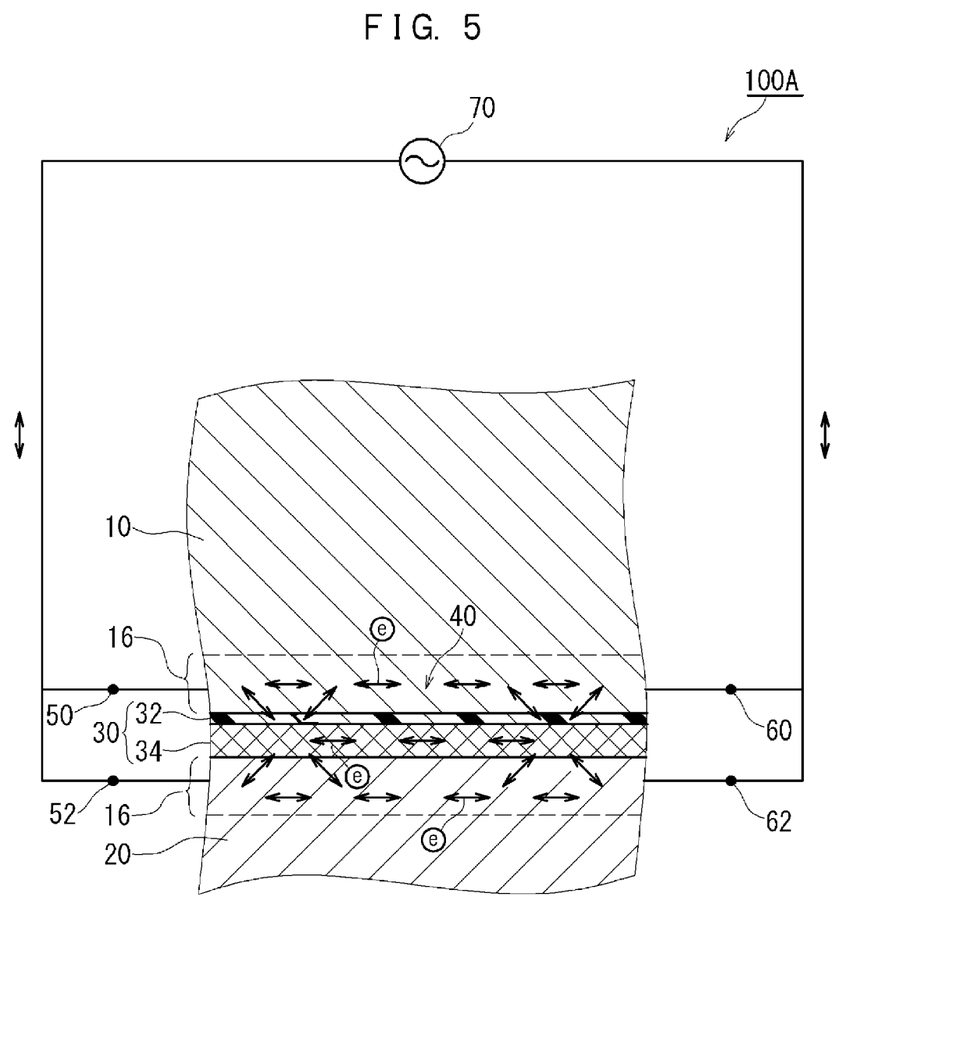
FIG. 5 is a view showing a current application state in another preferred embodiment of the resin molding apparatus of the present invention.

In a resin molding apparatus 100A according to another preferred embodiment, electrodes 50, 52, 60 and 62 are arranged at two points flanking the molding portion 40 on each of the pair of metal molds 10 and 20, respectively, as shown in FIG. 4. The high frequency current generator 70 in this case may be, as shown in FIG. 4, connected to the electrodes 50 and 60 arranged to flank the molding portion 40 in the upper metal mold 10 so as to be connected in parallel to the electrodes 52 and 62 arranged to flank the molding portion 40 in the lower metal mold 20. In this case, high frequency current is applied to the upper and lower metal molds 10 and 20 as shown in FIG. 5. As described above, the upper and lower metal molds 10 and 20 are connected in parallel to the high frequency current generator 70, so that no potential difference is generated that could cause a short circuit between the upper and lower metal molds 10 and 20. Thus, the resin molding apparatus 100A can appropriately heat the resin material 30 placed in the molding portion 40 without causing a short circuit. In this case, the upper and lower metal molds 10 and 20 are heated in their respective surface portions 16, so that the resin material 30 can be rapidly heated.

Figure 6:
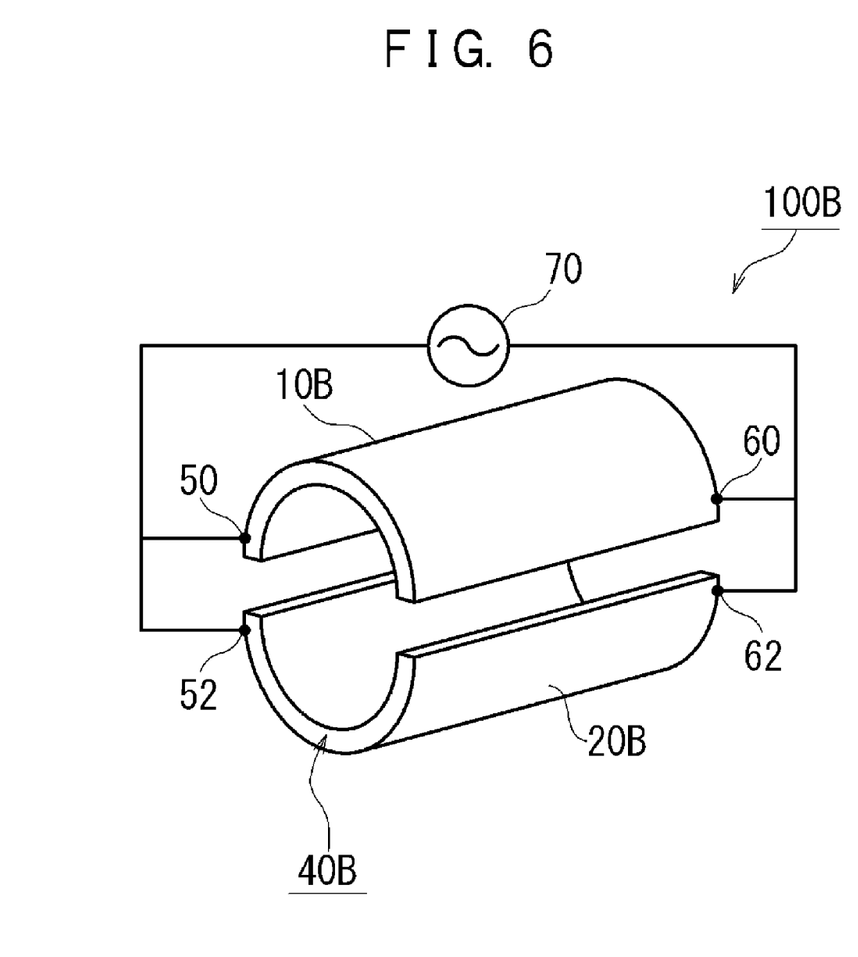
FIG. 6 is a view showing another preferred embodiment of the resin molding apparatus of the present invention.

In a resin molding apparatus 100B according to another preferred embodiment, the surface of a molding portion 40B in metal molds 10B and 20B is atypical as shown in FIG. 6. The metal molds 10B and 20B are respectively arranged so as to be insulated from the ground with insulating materials (not shown), which configuration is not shown in FIG. 6. In the example shown in FIG. 6, the molding portion 40B defines a molding space that is preferably circular or substantially circular in cross-section jointly by the upper and lower metal molds 10B and 20B. According to the resin molding apparatus 100B, the high frequency current generator 70 is connected in parallel to two electrodes 50, 52, 60 and 62 flanking the molding portion 40B on each of the pair of the metal molds 10B and 20B. In this case, the surface portion of the molding portion 40B in the metal molds 10B and 20B is heated by utilizing the nature of high frequency current that flows in the surface portion of the metal mold 40B of the metal molds 10B and 20B. Therefore, the surface portion of the molding portion 40B is appropriately heated regardless of the shape of the molding portion 40B. Accordingly, molded articles having atypical shapes can be molded. According to the present preferred embodiment of the resin molding apparatus, a shape of molded articles, but not the thickness thereof, is to be considered to design the molds because electrodes can be arranged with greater flexibility, so that the shape of molded articles also has greater flexibility.

As described above, the resin molding apparatus according to one preferred embodiment of the present invention preferably includes the pair of metal molds 10 and 20 respectively arranged so as to be insulated from the ground with insulating materials 11 and 21 and the molding portion 40 which is defined by the pair of metal molds 10 and 20 and is provided with the resin material 30. At least one metal mold 10 of the pair of metal molds 10 and 20 includes electrodes 50 and 60 arranged at two points flanking the molding portion 40. The high frequency current generator 70 is connected to two electrodes 50 and 60, which can apply high frequency current having a frequency of about 10 kHz or more, for example.

According to such a resin molding apparatus as described above, because the pair of metal molds 10 and 20 is arranged via insulating materials 11 and 21, high frequency current can be applied to the metal molds 10 and 20 while the metal molds 10 and 20 are closed after the resin material 30 is provided to the molding portion 40. A short circuit does not occur when high frequency current is applied to the metal molds 10 and 20 because the metal molds 10 and 20 are respectively insulated from the ground with insulating materials 11 and 21. A pair of electrodes 50 and 60 is provided at two points flanking the molding portion 40 in the metal molds 10 and 20, and high frequency current having a frequency of about 10 kHz or more, for example, is applied from the high frequency current generator 70 connected to the electrodes 50 and 60.

When high frequency current having a frequency of about 10 kHz or more, for example, is applied according to such configuration, the surface of the molding portion 40 of the metal molds 10 and 20 is particularly heated. Accordingly, the resin molding apparatus can effectively heat the resin material 30. In this resin molding apparatus 100, the metal molds 10 and 20 are particularly heated in their surfaces, so that the time required for cooling the metal molds 10 and 20 can be reduced and the total molding cycle can be shortened. It is possible to attain a lighter resin molding apparatus, for example, by providing a thinner movable mold than a fixed mold. In this case, a load imposed on a driving mechanism (e.g., a press) arranged to drive the movable mold can be reduced. Therefore, it is possible to reduce the cost of energy for resin molding.

Preferred embodiments of the resin molding apparatus and resin molding method according to the present invention have been described hereinabove. However, it should be understood that the resin molding apparatus and resin molding method according to the present invention is not limited to the various preferred embodiments described above.

For example, in the above preferred embodiments, the fiber-reinforced thermoplastic composite material is exemplified as the thermoplastic resin material. Such fiber-reinforced thermoplastic composite material preferably includes, for example, a composite sheet of a thermoplastic resin nonwoven fabric combined with continuous reinforcement fibers as disclosed in Japanese Patent Publication No. 3947560.

The thermoplastic resin material may include fiber-reinforced thermoplastic composite materials. Reinforcement fibers contained in the fiber-reinforced thermoplastic composite material exemplified above preferably are carbon fibers and glass fibers, for example. However, reinforcement fibers contained in the fiber-reinforced thermoplastic composite material are not limited thereto and may be fibers of plant origin, for example.

The thermoplastic resin material is not limited to those described above and includes various thermoplastic resin materials. The thermoplastic resin materials suitable to be molded in the resin molding apparatus or by the resin molding method of the present invention preferably include, but are not limited to, for example, polyolefin-based resins such as polyethylenes, polypropylenes; polyamide-based resins typically including nylon 6, nylon 66, nylon 12 and nylon 46; polyester-based resins such as polyethylene terephthalate, polybutylene terephthalate; polyetherketone resins; polyphenylene sulfide resins; polyetherimide resins; polycarbonate resins and the like.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A resin molding apparatus comprising:
a press;
a pair of metal molds respectively arranged in the press so as to be insulated from ground with respective insulating materials;
a molding portion including the pair of metal molds;
a pair of electrodes provided at two points flanking the molding portion and arranged on both sides of the molding portion in either metal mold of the pair of metal molds; and
a high frequency current generator electrically connected through the pair of electrodes to the either metal mold and configured to generate heat at a surface portion of the molding portion in either metal mold by applying a high frequency current having a frequency of about 10 kHz or more between the pair of electrodes.

2. A resin molding apparatus comprising:
a press;
a pair of metal molds respectively arranged in the press so as to be insulated from ground with respective insulating materials;
a molding portion including the pair of metal molds;
a pair of electrodes provided at two points flanking the molding portion and arranged on both sides of the molding portion in each of the pair of metal molds; and
a high frequency current generator electrically connected through the pair of electrodes to the pair of metal molds so that the pair of metal molds are connected in parallel and configured to generate heat at a surface portion of the molding portion in each metal mold by applying a high frequency current having a frequency of about 10 kHz or more between the pair of electrodes.

* * * * *